United States Patent
Takemura

[11] Patent Number: 6,095,692
[45] Date of Patent: Aug. 1, 2000

[54] ROLLING BEARING

[75] Inventor: Hiromichi Takemura, Kanagawa, Japan

[73] Assignee: NSK Ltd., Tokyo, Japan

[21] Appl. No.: 09/227,888

[22] Filed: Jan. 11, 1999

[30] Foreign Application Priority Data

Jan. 12, 1998 [JP] Japan .................................. 10-004069

[51] Int. Cl.$^7$ .................................................. F16C 33/32
[52] U.S. Cl. ........................ 384/492; 384/565; 384/912
[58] Field of Search ................................... 384/492, 565, 384/569, 912, 913

[56] References Cited

U.S. PATENT DOCUMENTS

| | | | |
|---|---|---|---|
| 4,930,909 | 6/1990 | Murakami et al. | 384/492 |
| 5,030,017 | 7/1991 | Murakami et al. | 384/492 |
| 5,084,116 | 1/1992 | Mitamura | 384/492 X |

FOREIGN PATENT DOCUMENTS

| | | |
|---|---|---|
| 2-277764 | 11/1990 | Japan . |
| 4-297552 | 10/1992 | Japan . |
| 9-53169 | 2/1997 | Japan . |
| 411201168 | 7/1999 | Japan . |

*Primary Examiner*—Khoi Q. Ta
*Attorney, Agent, or Firm*—Sughrue, Mion, Zinn, Macpeak & Seas, PLLC

[57] ABSTRACT

The present invention provides a rolling bearing comprising an inner ring, an outer ring and rolling elements as constituting members, wherein at least one of the members is formed by a steel material for bearing and has been subjected to carburizing or carbonitriding and titanium carbides or titanium carbonitrides having an average particle diameter of not more than 80 nm are dispersed in the surface and interior thereof, the steel material having an alloy composition composed of: C: 0.15 to 0.45% by weight; Si: 0.1 to 1.2% by weight; Mn: 0.2 to 1.5% by weight; Cr: 0.2 to 1.6% by weight; and Ti: 0.05 to 0.40% by weight. The rolling bearing is insusceptible to the occurrence of impressions particularly even in the presence of foreign matters, has excellent abrasion resistance, and is insusceptible to corrosion pitting (including hydrogen-induced crack) even under conditions that allow the occurrence of corrosion pitting in the presence of water.

8 Claims, 4 Drawing Sheets

ROLLING BEARING

FIELD OF THE INVENTION

The present invention relates to a rolling bearing. More particularly, the present invention relates to prolongation of the life of rolling bearing for use in transmission or engine of automobile, agricultural machine, construction machinery and steel-making machinery and enhancement of abrasion resistance of guide roll bearing for continuous casting, roll neck bearing for rolling mill, linear guide, ball screw, etc.

BACKGROUND OF THE INVENTION

In general, a rolling bearing exhibits a remarkably shortened life when it operates in the presence of foreign matters in its lubricant as compared with when it operates free from foreign matters. This is because if a rolling bearing is lubricated with a lubricant contaminated with foreign matters such as metal cuttings, shavings, burr and powder from abrasion, these foreign matters cause the occurrence of impressions or pits (damage) on the surface of the track on the inner and outer rings and the rolling surface of the rolling elements from which damaged points flaking starts to occur to remarkably shorten the life of the rolling bearing.

An experimental study of this phenomenon, "Contamination with foreign matters and rolling fatigue life", NSK Technical Journal No. 655, pp. 17–24, 1993, discloses that some content of foreign matters, some hardness of foreign matters or some size of foreign matters cause the life of a rolling bearing to be shortened to about $\frac{1}{8}$ of that of lubrication free of foreign matters. A reproduction was made of a phenomenon that the effect of contamination with foreign matters and rolling fatigue causes the occurrence of fine impressions having a depth of from scores of micrometers to 100 micrometers on the track or rolling surface of the bearing from which impressions flaking starts to occur, reducing the rolling fatigue of the bearing.

As an prior art approach for eliminating the shortening of rolling life due to this phenomenon there is disclosed in JP-B-7-110988 (The term "JP-B" as used herein means an "examined Japanese patent publication") a technique involving the enhancement of surface hardness of at least one the inner ring, outer ring and rolling elements of a rolling bearing by the formation of a proper amount of fine carbide on the surface layer thereof as well as the elimination of the occurrence of microcracks during lubrication in the presence of foreign matters by the incorporation of a proper amount of retained austenite in the surface layer thereof.

JP-A-9-53169 (The term "JP-A" as used herein means an "unexamined published Japanese patent application") discloses as an alloy composition (hereinafter % by weight) of case hardening steel to be used for carburized parts for driving shaft coupling which must exhibit a high surface hardness an alloy comprising C in an amount of from 0.1 to 0.25%, Si in an amount of from 0.2 to 0.4%, Mn in an amount of from 0.3 to 0.9%, Cr in an amount of from 0.5 to 0.9%, and at least one of Ni in an amount of from 0.3 to 4.0%, Ti in an amount of from 0.01 to 0.3%, Nb in an amount of from 0.01 to 0.3%, V in an amount of from 0.01 to 0.3% and Zr in an amount of from 0.01 to 0.3% and having a surface hardness Hv of from 650 to 800.

Further, Kobe Seiko Giho (Kobe Steel, Ltd.'s Technical Report), vol. 47, No. 2, September 1998, describes in the paragraph titled "Corrosion fatigue characteristics and improvement of steel for high strength suspension spring" an attempt to improve the corrosion fatigue characteristics of spring steel according to JIS SUP7 (C: 0.42%; Si: 1.69%; Mn: 0.18%) from the standpoint of elimination of corrosion pits by the adjustment of components by the incorporation of Cu, Ni, Cr, V and Ti in an amount of 0.20%, 0.33%, 1.06%, 0.15% and 0.05%, respectively, and a material designed taking into account the susceptibility to hydrogen embrittlement.

The rolling bearing disclosed in the above cited JP-B-7-110988 is made of an alloy steel comprising at least C and Cr in an amount of from 0.3 to 0.5% by weight and from 3 to 14% by weight, respectively, and its surface layer has a fine carbide content of from 20 to 50 vol-% and a retained austenite content of from 10 to 25 vol-%. Therefore, the foregoing rolling bearing is advantageous in that it exhibits an enhanced surface hardness and hence an improved impression resistance. However, the foregoing rolling bearing comprises a fine carbide having an average particle diameter as large as from 0.5 to 1.0 $\mu$m and thus leaves something to be desired in abrasion resistance.

Further, the case hardening steel disclosed in the above cited JP-A-9-53169 simply comprises alloying elements such as Ti and V incorporated therein to exhibit an enhanced impact resistance or toughness itself. However, some combination of these additive elements cannot be expected to allow the production of fine carbides. Further, when the case hardening having such a composition is used as a material of parts constituting the rolling bearing, impressions can easily occur on the track if the track is contaminated by foreign matters, making it difficult to sufficiently inhibit early flaking. Thus, the foregoing case hardening steel leaves something to be desired in this respect.

Moreover, the high strength spring steel reported in the above cited Kobe Steel, Ltd.'s Technical Report comprises valuable elements such as Cu, Ni, Cr, V and Ti incorporated therein to eliminate the occurrence of corrosion pits from which corrosion fatigue starts to occur. The foregoing high strength spring steel comprises crystals having a reduced size to exhibit an enhanced toughness. However, these ordinary spring steel materials to be subjected to 850° C. oil hardening and 450° C. tempering cannot be expected to exhibit a surface hardness which can sufficiently satisfy impression resistance or abrasion resistance required for rolling bearing.

On the other hand, as an example of the shortening of the life of a rolling bearing by contamination by water there is described in J. A. Cirura et al., "Wear, 24 (1973), pp. 107–118, The Effect of Hydrogen on the Rolling Contact Fatigue Life of AISI 52100 and 440C Steel Balls" a four-ball rolling test involving the contamination of the lubricant with water resulting in the shortening of the life of a rolling bearing to about $\frac{1}{10}$ of that free of water. This reference also describes that a rolling fatigue test on steel balls charged with hydrogen showed that a stainless steel ball has a longer life than a steel ball of the second kind of bearing steel. However, the use of such a stainless steel ball as a countermeasure for the prolongation of life costs much as compared with the use of a steel ball of the second kind of bearing steel and thus can hardly be realized in practice.

SUMMARY OF THE INVENTION

It is therefore an object of the present invention to provide a rolling bearing having a prolonged life obtained by improving the composition of case hardening bearing steel material and its treatment process to have titanium carbides and titanium carbonitrides having an average particle diameter of not more than 80 nm finely dispersed in the surface and interior of members of the rolling bearing, making the members insusceptible to the occurrence of impressions particularly even in the presence of foreign matters.

It is another object of the present invention to provide a rolling bearing having a prolonged life obtained by preventing crystalline particles from becoming coarse during hardening to enhance the abrasion resistance.

It is a further object of the present invention to provide a rolling bearing having a prolonged life obtained by having TiC and TiCN finely dispersed in members of the rolling bearing to make the rolling bearing insusceptible to corrosion pitting (including hydrogen-induced crack) even under conditions that allow the occurrence of corrosion pitting in the presence of water.

These and other objects of the present invention will become more apparent from the following detailed description and examples.

These objects of the present invention are accomplished with a rolling bearing comprising an inner ring, an outer ring and rolling elements, at least one of the members being formed by a steel material for bearing having the following alloy composition and having been subjected to carburizing or carbonitriding and titanium carbides or titanium carbonitrides having an average particle diameter of not more than 80 nm being dispersed in the surface and interior thereof: Alloy composition of steel material for bearing (% by weight)

C: 0.15 to 0.45%; Si: 0.1 to 1.2%; Mn: 0.2 to 1.5%; Cr: 0.2 to 1.6%; Ti: 0.05 to 0.40%

In the rolling bearing according to the present invention, the finely divided particles of titanium carbides and titanium carbonitrides having an average particle diameter of not more than 80 nm dispersed in the steel reinforce the matrix to make the track or rolling surface of the bearing to insusceptible to the occurrence of impressions. Further, the hard titanium carbides and titanium carbonitrides finely dispersed in the steel improve the abrasion resistance of the steel. Since the rolling bearing according to the present invention exhibits an enhanced toughness, cracking, if any, can be propagated slowly. Moreover, even when the lubrication is effected in the presence of water, titanium carbides and titanium carbonitrides can become hydrogen trap sites that cause hydrogen to undergo dispersion and adsorption at the interface of titanium carbides and titanium carbonitrides, making it difficult to make defects and reduce the concentration of hydrogen in the plastically deformable region of the forward end of crack. As a result, the occurrence of corrosion pitting (including hydrogen-induced cracking) is retarded.

BRIEF DESCRIPTION OF THE DRAWINGS

By way of example and to make the description more clear, reference is made to the accompanying drawings in which.

DETAILED DESCRIPTION OF THE INVENTION

Figure 1:
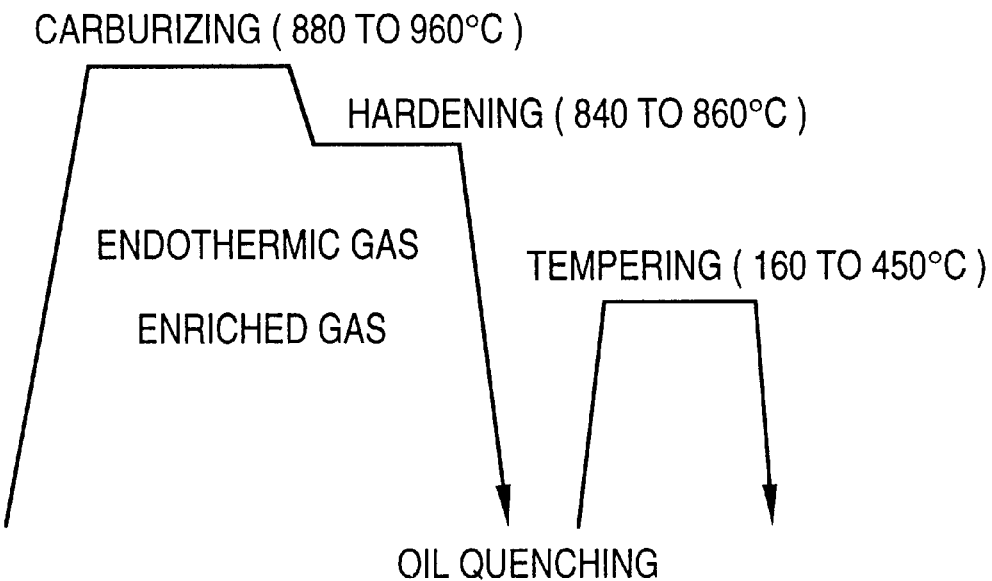
FIGS. 1(a) and 1(b) each is a heat cycle charts illustrating example of carburizing or carbonitriding, hardening and tempering applied to members constituting a rolling bearing.
Figure 1:
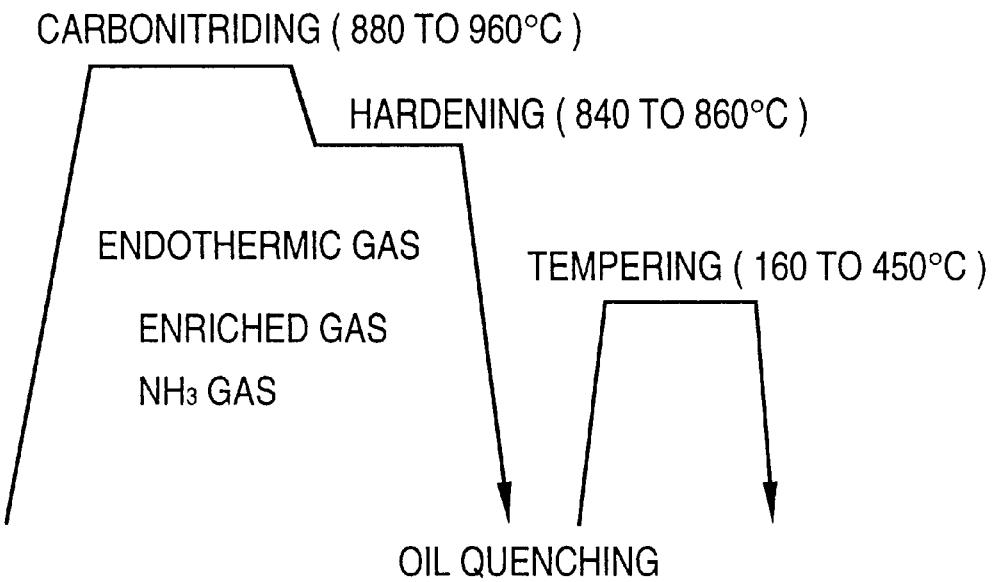

The rolling bearing of the present invention will be described in more detail below.

(1) The rolling bearing according to the present invention comprises an inner ring, an outer ring and rolling elements as constituting members, wherein at least one of the members is formed by an alloy steel material for bearing and has been subjected to carburizing or carbonitriding and titanium carbides or titanium carbonitrides having an average particle diameter of not more than 80 nm are dispersed in the surface and interior of the finished product, the alloy steel material having an alloy composition composed of:
C: 0.15 to 0.45% by weight;
Si: 0.1 to 1.2% by weight;
Mn: 0.2 to 1.5% by weight;
Cr: 0.2 to 1.6% by weight; and
Ti: 0.05 to 0.40% by weight.

Furthermore, the following rolling bearings are preferred.

(2) The rolling bearing of item (1), wherein the alloy composition further comprises Mo in an amount of 0.1 to 1.5% by weight.

(3) The rolling bearing of item (1), wherein the titanium carbides or titanium carbonitrides have an average particle diameter of not more than 50 nm.

(4) The rolling bearing of item (1) or (2), wherein the finished product of the member formed by the alloy steel material has a surface hardness of not less than Hv 800 and a retained austenite content of 30 to 45 vol %.

(5) The rolling bearing of item (1), wherein the finished product of the member formed by the alloy steel material has a surface C content of 0.8 to 1.2%.

(6) The rolling bearing of item (1), wherein the finished product of the member formed by the alloy steel material has a surface N content of 0.05 to 0.50% and a surface C content of 0.8 to 1.2%.

(7) The rolling bearing of item (1) wherein the finished product of the member formed by the alloy steel material has a surface hardness of Hv 700 or more.

The critical significance of the alloying components of bearing steel material from which at least one member of the inner ring, outer ring and rolling elements constituting the rolling bearing of the present invention will be described hereinafter. The term "%" as used herein means % by weight, unless indicated otherwise.

C: 0.15 to 0.45%

Carburizing or carbonitriding is effected in order to minimize the amount of inclusions that cause damage or flaking on the track or rolling surface of a rolling bearing possibly resulting in the shortening of the life of the rolling bearing, there by obtaining a stabilized purity for mass-produced material, and to obtain a hardness required for resistance to rolling fatigue.

In order to shorten the processing time, the content of C needs to be not less than 0.15%. However, if the content of C exceeds 0.45%, the resulting steel material is liable to drop of cracking resistance and leaves something to be desired in dimensional stability at high temperature. Thus, the content of C in the steel material is defined to a range of from 0.15 to 0.45%.

Si: 0.1 to 1.2%

Si is an element which retards the structural change of the steel material as well as improves the hardenability of the steel material. If the content of Si falls below 0.1%, the resulting deoxidation effect is insufficient. On the contrary, if the content of Si exceeds 1.2%, the resulting steel material exhibits a remarkably deteriorated workability. Thus, the content of Si is defined to a range of from 0.1 to 1.2%.

Mn: 0.2 to 1.5%

Mn is an element effective for the enhancement of the hardenability of the steel material. If the content of Mn falls below 0.2%, the resulting steel material exhibits an insufficient hardenability. On the contrary, if the content of Mn exceeds 1.5%, the resulting steel material exhibits a deteriorated workability.

Thus, the content of Mn is defined to a range of from 0.2 to 1.5%.

Cr: 0.2 to 1.6%

Cr is an element which improves the hardenability of the steel material as well as accelerates the spheroidization of carbide. The content of Cr needs to be not less than 0.2%. If the content of Cr exceeds 1.6%, the carbides become coarse, causing the rise in the average diameter of crystals or possibly deteriorating the grindability of the steel material. Thus, the content of Cr is defined to a range of from 0.2 to 1.6%.

Ti: 0.05 to 0.40%

Ti is an element which can be finely dispersed in a steel material in the form of titanium carbide or titanium carbonitride to prolong the rolling life of the bearing and improve the abrasion resistance of the bearing. Ti is also an element which prevents crystals from becoming coarse during hardening. Further, Ti acts as a hydrogen trap site. If the content of Ti is not more than 0.05%, most of Ti thus dispersed occurs in the form of particulate titanium nitride having a size of not less than 1 μm, giving no effect of titanium carbide (TiC) and titanium carbonitride (TiCN)

On the contrary, if the content of Ti exceeds 0.40%, the resulting steel material exhibits a deteriorated workability, and the titanium carbides and titanium carbonitrides thus dispersed have a size of greater than 80 nm. Further, inclusions (TiN, TiS) which deteriorate the rolling life of the steel material can be easily produced. Thus, the content of Ti is defined to a range of from 0.05 to 0.40%.

N, P, S, O, Mo and Ni

These elements may be selectively incorporated in the steel material as necessary.

N exerts a great effect of enhancing the fine dispersion of titanium carbide and titanium carbonitride on the prolongation of the rolling life. However, if the content of N increases, the content of titanium nitride increases while the content of titanium carbide and titanium carbonitride decreases. Thus, the upper limit of the content of N in the steel material is defined to 0.01%.

P is an element which deteriorates the rolling life and toughness of the steel material. Thus, the upper limit of the content of P is defined to 0.02%.

S is an element which enhances the grindability of the steel material. However, S combines with Mn to produce sulfide inclusions which shorten the rolling life of the steel material.

Thus, the upper limit of the content of S is defined to 0.02%.

O is an element which produces oxide inclusions in the steel material to shorten the rolling life of the steel material.

Thus, the upper limit of the content of O is defined to 0.0016%.

Mo is an element which exhibits resistance to temper softening and exerts an effect of facilitating the fine dispersion of carbide to enhance the hardness of the bearing. Thus, the content of Mo needs to be not less than 0.1%. Even if the content of Mo exceeds 1.5%, the resulting effect is saturated. The resulting steel material possibly exhibits a deteriorated workability. Accordingly, the content of Mo is defined to a range of from 0.1 to 1.5%.

Ni exerts an effect of reinforcing the matrix to enhance the toughness of the steel material, thereby prolonging the rolling life of the bearing. If the content of Ni exceeds 0.20%, the amount of retained austenite increases, making the steel material more resistant to impression. However, Ni is an expensive element. The excessive addition of Ni merely adds to the cost of material to no avail. Thus, Ni is added in a proper amount.

In the rolling bearing according to the present invention, at least one member of the inner ring, outer ring and rolling elements constituting the rolling bearing is formed by a bearing steel having the foregoing composition. This material is subjected to solution treatment at a temperature of from 1,150° C. to 1,350° C. so that Ti can be fused into the matrix.

The constituent member of the rolling bearing formed by this material is subjected to solution treatment, normalizing at a temperature of from 850° C. to 950° C. and annealing for spheroidization so that TiC and TiCN having a size of not more than 80 nm can be finely dispersed and deposited therein. Thus, the content of carbon and nitrogen in the surface of the member which has been subjected to carburizing or carbonitriding, hardening, tempering and grinding are defined to the following range:

Surface Content of C: 0.8 to 1.2%

In order to obtain a sufficient surface hardness for rolling fatigue resistance of the bearing member which has been subjected to predetermined heat treatment and grinding, the surface carbon content needs to be not less than 0.8%. However, if the surface carbon content exceeds 1.2%, huge carbides can be easily produced to give sites from which cracking starts to occur.

Thus, the surface carbon content is defined to a range of from 0.8 to 1.2%.

Surface Content of N: 0.05 to 0.50%

The reason why the surface nitrogen content is defined is that if the surface nitrogen content is not less than 0.05%, the resulting steel material exhibits an enhanced tempering resistance, and the resulting effect of dispersing and depositing fine carbonitrides provides an enhanced strength. On the contrary, if the surface nitrogen content exceeds 0.50%, the resulting steel material exhibits an enhanced abrasion resistance that makes itself less grindable and resistant to brittle cracking.

Thus, the surface nitrogen content is defined to a range of from 0.05 to 0.50%.

The above defined surface carbon content and surface nitrogen content can apply also when either or both of carburizing and carbonitriding is effected.

In this arrangement, the desired surface hardness Hv (not less than 700) of the member constituting the rolling bearing of the present invention can be accomplished. At the same time, titanium carbides and titanium carbonitrides having an average particle diameter of not more than 80 nm can be dispersed in the surface and interior of the member.

The surface carbon content and surface nitrogen content can be measured by means of emission spectrochemical analysis, and the average particle diameter of the carbides or carbonitrides and the amount of residual austenite can be measured by means of image analysis and X-ray diffraction, respectively, according to known methods. The surface hardness Hv can be measured according to JIS Z 2244.

A life test on rolling bearings of the present invention will be described hereinafter.

The chemical components of the rolling bearing material used in this life test are set forth in Table 1.

The material is subjected to heating (through hardening) to a temperature of from 840° C. to 860° C. for 0.5 to 1 hour in an atmosphere of an endothermic gas, and then subjected to oil quenching (hardening). Subsequently, the material was

TABLE 1

|  |  | C | Si | Mn | Cr | Mo | Ni | N | O (ppm) | Ti | Surface C Content (%) | Surface N Content (%) | TiC, TiCN, (nm) | Heat Treatment |  |
|---|---|---|---|---|---|---|---|---|---|---|---|---|---|---|---|
| Example | 1 | 0.45 | 0.36 | 1.09 | 1.18 | — | — | 0.0030 | 15 | 0.050 | 0.85 | — | 80 | Carburizing |  |
|  | 2 | 0.20 | 0.32 | 1.19 | 1.59 | 0.59 | 2.91 | 0.0030 | 10 | 0.260 | 1.11 | — | 49 | Carburizing |  |
|  | 3 | 0.24 | 0.28 | 0.21 | 0.95 | — | — | 0.0055 | 9 | 0.150 | 0.95 | — | 69 | Carburizing |  |
|  | 4 | 0.20 | 0.25 | 0.74 | 1.00 | 0.10 | — | 0.0030 | 10 | 0.400 | 0.80 | — | 24 | Carburizing |  |
|  | 5 | 0.18 | 0.22 | 0.44 | 0.28 | — | 0.20 | 0.0030 | 8 | 0.080 | 0.97 | — | 12 | Carburizing |  |
|  | 6 | 0.42 | 0.15 | 0.59 | 1.60 | 0.30 | — | 0.0040 | 7 | 0.200 | 1.20 | — | 9 | Carburizing |  |
|  | 7 | 0.15 | 0.32 | 0.65 | 0.20 | — | 2.03 | 0.0030 | 5 | 0.110 | 1.07 | — | 24 | Carburizing |  |
|  | 8 | 0.33 | 0.18 | 1.38 | 0.96 | 1.50 | — | 0.0030 | 14 | 0.250 | 1.05 | — | 42 | Carburizing |  |
|  | 9 | 0.43 | 1.20 | 0.98 | 0.87 | — | — | 0.0025 | 8 | 0.150 | 0.82 | — | 60 | Carburizing |  |
|  | 10 | 0.16 | 0.17 | 0.67 | 0.98 | 0.28 | — | 0.0030 | 7 | 0.240 | 0.99 | — | 61 | Carburizing |  |
|  | 11 | 0.35 | 0.32 | 0.76 | 1.12 | 0.21 | — | 0.0030 | 13 | 0.210 | 0.88 | 0.08 | 80 | carbonitriding |  |
|  | 12 | 0.21 | 0.49 | 0.20 | 1.05 | — | — | 0.0100 | 10 | 0.090 | 1.05 | 0.12 | 63 | carbonitriding |  |
|  | 13 | 0.29 | 0.10 | 0.38 | 0.87 | — | — | 0.0030 | 11 | 0.050 | 1.15 | 0.05 | 33 | carbonitriding |  |
|  | 14 | 0.40 | 1.05 | 0.72 | 1.47 | 1.03 | — | 0.0030 | 16 | 0.400 | 1.20 | 0.50 | 45 | carbonitriding |  |
|  | 15 | 0.33 | 0.65 | 0.35 | 1.32 | — | 0.37 | 0.0030 | 5 | 0.140 | 0.87 | 0.28 | 18 | carbonitriding |  |
|  | 16 | 0.45 | 0.19 | 0.47 | 0.20 | — | — | 0.0030 | 7 | 0.230 | 0.85 | 0.41 | 25 | carbonitriding |  |
|  | 17 | 0.41 | 0.39 | 0.62 | 1.50 | 1.00 | — | 0.0015 | 8 | 0.350 | 1.18 | 0.11 | 10 | carbonitriding |  |
|  | 18 | 0.32 | 1.18 | 0.48 | 1.59 | — | — | 0.0030 | 4 | 0.070 | 0.80 | 0.18 | 7 | carbonitriding |  |
|  | 19 | 0.24 | 0.32 | 1.50 | 1.36 | — | — | 0.0030 | 9 | 0.160 | 1.14 | 0.39 | 14 | carbonitriding |  |
|  | 20 | 0.17 | 0.22 | 0.64 | 0.55 | 0.29 | 0.48 | 0.0010 | 11 | 0.290 | 1.06 | 0.10 | 50 | carbonitriding |  |
| Comparative Example | 1 | 1.05 | 0.35 | 0.29 | 1.45 | — | — | 0.0055 | 14 | — | — | — | 0 | through hardening | SUJ2 |
|  | 2 | 0.60 | 2.06 | 0.94 | 0.15 | — | — | 0.0030 | 16 | — | — | — | 0 | through hardening | Spring steel |
|  | 3 | 0.43 | 1.70 | 0.18 | 1.06 | — | 0.33 | 0.0030 | 8 | 0.050 | — | — | 110 | through hardening | no Ti solution treatment |
|  | 4 | 0.15 | 0.33 | 0.57 | 0.60 | 0.45 | — | 0.0050 | 10 | 0.050 | 0.67 | — | 591 | carburizing | no Ti solution treatment |
|  | 5 | 0.16 | 0.34 | 0.05 | 0.60 | 0.45 | — | 0.0015 | 10 | 0.050 | 0.80 | — | 348 | carburizing | no Ti solution treatment |
|  | 6 | 0.39 | 0.44 | 0.31 | 14.80 | — | — | 0.0030 | 8 | 0.005 | 1.77 | — | 579 | carburizing |  |
|  | 7 | 0.05 | 0.02 | 0.57 | 0.88 | 0.54 | — | 0.0020 | 7 | 0.100 | 0.68 | — | 50 | carburizing |  |
|  | 8 | 0.24 | 0.23 | 2.50 | 0.08 | — | — | 0.0010 | 9 | 0.080 | 0.95 | — | 790 | carburizing | no Ti solution treatment |
|  | 9 | 0.10 | 0.77 | 0.33 | 0.95 | — | — | 0.0030 | 15 | 0.510 | 1.15 | — | 567 | carburizing |  |
|  | 10 | 0.43 | 0.25 | 0.70 | 0.95 | 1.20 | — | 0.0045 | 14 | 0.005 | 1.20 | — | 571 | carburizing |  |
|  | 11 | 0.15 | 0.01 | 0.56 | 0.36 | — | — | 0.0030 | 12 | 0.050 | 0.69 | 0.02 | 75 | carbonitriding |  |
|  | 12 | 0.05 | 0.28 | 1.05 | 1.12 | — | 0.55 | 0.0080 | 7 | 0.150 | 0.72 | 0.05 | 54 | carbonitriding |  |
|  | 13 | 0.41 | 1.89 | 0.35 | 0.89 | 1.03 | — | 0.0100 | 9 | 0.500 | 1.50 | 0.20 | 356 | carbonitriding |  |
|  | 14 | 0.08 | 0.18 | 0.44 | 0.95 | — | — | 0.0025 | 14 | 0.025 | 0.80 | 0.15 | 270 | carbonitriding |  |
|  | 15 | 0.43 | 0.25 | 0.70 | 9.72 | 1.20 | — | 0.0045 | 14 | 0.005 | 1.20 | 0.29 | 571 | carbonitriding |  |
|  | 16 | 0.25 | 0.33 | 0.08 | 0.05 | — | — | 0.0035 | 8 | 0.100 | 1.00 | 0.10 | 51 | carbonitriding |  |
|  | 17 | 0.32 | 0.49 | 0.56 | 0.65. | — | — | 0.0030 | 10 | — | 1.15 | 0.39 | 0 | carbonitriding |  |
|  | 18 | 0.23 | 0.27 | 1.89 | 1.59 | — | 0.25 | 0.0030 | 7 | 0.010 | 0.99 | 0.05 | 180 | carbonitriding |  |

These materials to be tested were each subjected to solution treatment at a temperature of from 1,150° C. to 1,350° C. so that Ti was fused into the matrix. The material was then subjected to normalizing at a temperature of from 850° C. to 950° C. and annealing for spheroidization so that TiC and TiCN having a size of not more than 80 nm was finely dispersed and deposited therein. Some of the comparative samples (Comparative Examples 3, 4, 5 and 8) were not subjected to solution treatment of Ti.

For testing, inner rings and outer rings of examples and comparative examples were produced from the specimen materials set forth in Table 1 by cold molding. These inner rings and outer rings were then subjected to the following two patterns of heat treatment.

(1) Carburizing

As shown in FIG. 1(a), in an atmosphere of an endothermic gas and enriched gas at a temperature of from 880° C. to 960° C., the material is subjected to heat treatment (carburizing) for 10 to 15 hours, and then allowed to cool.

heated to a temperature of from 160° C. to 450° C. in the atmosphere for 2 hours, and then cooled (tempering).

(2) Carbonitriding

As shown in FIG. 1(b), in an atmosphere of an endothermic gas and enriched gas at a temperature of from 880° C. to 960° C., the material is subjected to heat treatment (carbonitriding) for 5 to 10 hours, and then allowed to cool. The material is subjected to heating (through hardening) to a temperature of from 840° C. to 860° C. for 0.5 to 1 hour in an atmosphere of an endothermic gas, and then subjected to oil quenching (hardening). Subsequently, the material was heated to a temperature of from 160° C. to 450° C. in the atmosphere for 2 hours, and then cooled (tempering).

The inner ring and outer ring thus produced exhibited a surface hardness Hv of from 650 to 900, a surface retained austenite content of from 1 to 45 vol-% and a track surface roughness Ra of from 0.01 to 0.03 μm. Further, in both the examples of the present invention and the comparative examples, the rolling elements were produced from bearing steel of the second kind. The rolling elements were then subjected to ordinary heat treatment to have a surface hardness Hv of from 700 to 750 and a surface roughness Ra of from 0.003 to 0.010 μm.

Rolling bearings comprising these inner rings, outer rings and rolling bodies were each then subjected as a specimen to the following three kinds of life tests.

Comparison Test 1

This was a life test made by operating a bearing having impressions previously while being lubricated free of foreign matters.

Figure 2:
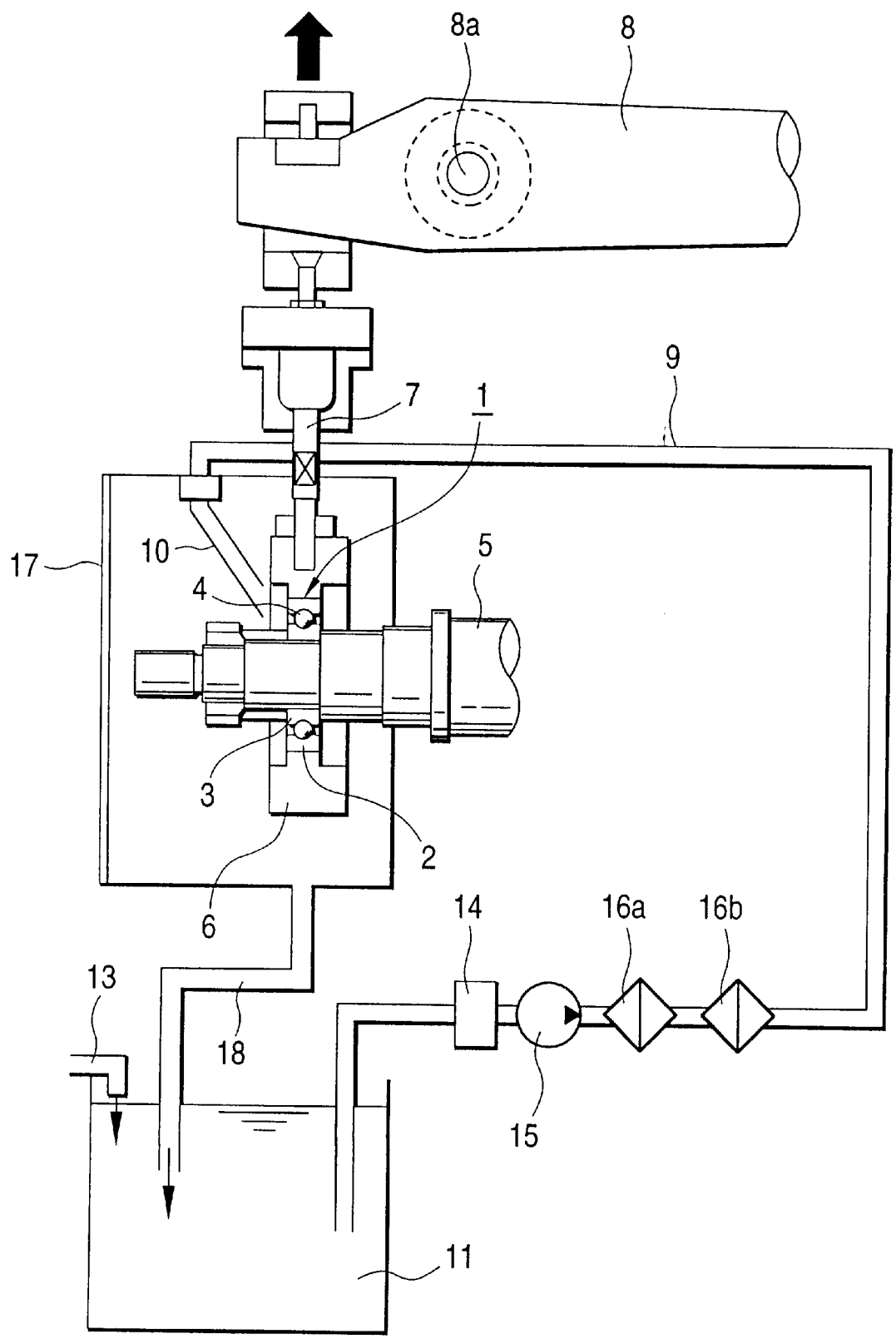
FIG. 2 is a schematic diagram illustrating a cantilever life testing machine used in Comparison Life Test 1 on a rolling bearing.

Testing Apparatus:

As a testing apparatus there was used a cantilever type life testing apparatus shown in FIG. 2 described in "Contamination with foreign matters and rolling fatigue life", NSK Technical Journal No. 655, pp. 17–24, 1993. This testing apparatus is equipped with a rotary shaft 5 on which a bearing 1 to be tested (outer ring 2, inner ring 3, rolling elements 4) is mounted. The inner ring 3 is fitted onto the rotary shaft 5. The outer ring 2 is fixed to a housing 6 in which the bearing 1 is housed. When the rotary shaft 5 is rotated by a motor not shown, the inner ring 3 rotates to cause the balls 4 to roll. To the housing 6 is connected a load lever 8 via a load shaft 7. This arrangement is such that when the load lever 8 is allowed to swing about a horizontal shaft 8a, a predetermined load is applied to the outer ring 2 fixed to the housing 6 via the load shaft 7. In the housing 6 is provided an oil discharge port 10 connected to a lubricant supply circuit 9. In this arrangement, a lubricant 11 is supplied into the bearing 1. The supply circuit 9 in the oil discharge portion 10 is connected to an oil tank 12 which receives the lubricant. This arrangement is such that the oil tank 12 is replenished with the lubricant from a replenishment circuit 13 at a rate of 5 cc per hour.

Foreign matters such as iron powder and water may be intentionally added to the lubricant 11 in the oil tank 12 from the replenishment circuit 13. Provided in the lubricant supply circuit 9 are a flowmeter 14, a pump 15 and filters 16a and 16b in the upstream order. The housing 6 and the oil discharge portion 10 are surrounded by a chamber 17. This arrangement is such that excess lubricant which has dropped onto the bottom of the chamber 17 is recovered by the oil tank 12 via a recovery circuit 18.

Testing Method:

As a bearing 1 to be tested there was used a deep groove ball bearing (Type 6206). The testing load Fr applied to the load lever 8 was 900 kgf. The testing rotary speed was 3,900 rpm. As a lubricant there was used a Type VG68 turbine oil.

0.005 g of 1% steel beads (size: 44 to 74 μm) having Hv of 730 were added to the lubricant in the oil tank 12 of the foregoing testing apparatus as foreign matters. The rotary shaft 5 was then rotated so that initial impressions were formed on the inner ring 3 of the bearing 1. The bearing 1 was then washed.

Only the outer ring 2 and rolling elements 4 of the bearing 1 were renewed. The inner ring 3 having impressions and the new outer ring 3 and rolling elements 4 were assembled to a bearing 1 which was then subjected to an endurance test while being lubricated free of foreign matters ten times for each specimen.

The test was suspended when the bearing 1 showed vibration five times as much as the initial value. The bearing 1 was then observed for flaking. The calculated life of the bearing is 45 hours. Accordingly, the testing time was predetermined to 300 hours, which is about 7 times the calculated life.

Table 2 shows the results of the life test as Comparison Test 1 on the specimens of the examples of the present invention and the comparative examples, i.e., surface hardness, surface retained austenite content, life $L_{10}$ and flaking conditions. The average particle diameter of titanium carbide and titanium carbonitride in the steel material are set forth in Table 1.

Figure 3:
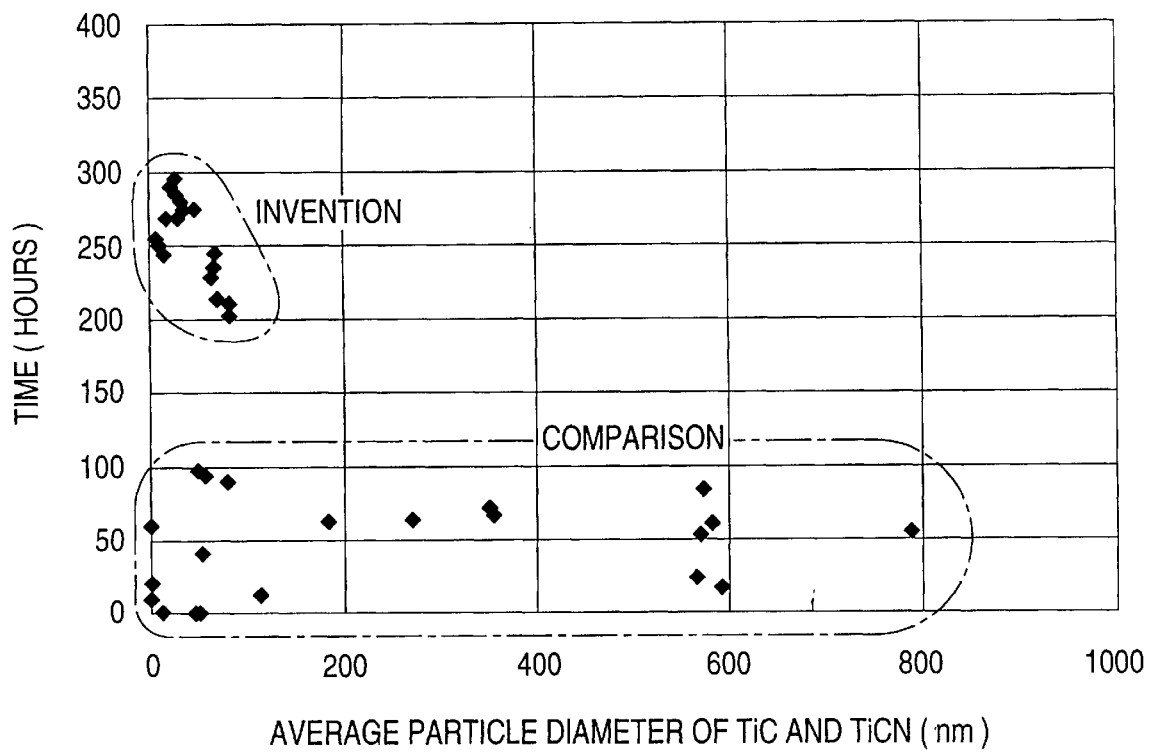
FIG. 3 illustrates the results of the rolling life test on examples of the present invention and comparative examples in Comparison Life Test 1.

FIG. 3 is a graph illustrating the relationship between the average particle diameter of TiC and TiCN and the evaluated life time ($L_{10}$) in the foregoing life test.

TABLE 2

| | | Surface Hardness (Hv) | Surface γR vol (%) | L10 (hr) | Flaking |
|---|---|---|---|---|---|
| Example | 1 | 723 | 19 | 204 | 9/10 flaking on inner race |
| | 2 | 813 | 45 | 300→ | None |
| | 3 | 735 | 23 | 215 | 7/10 flaking on inner race |
| | 4 | 763 | 26 | 285 | 5/10 flaking on inner race |
| | 5 | 703 | 4 | 245 | 8/10 flaking on inner race |
| | 6 | 821 | 38 | 300→ | None |
| | 7 | 768 | 45 | 295 | 4/10 flaking on inner race |
| | 8 | 751 | 25 | 275 | 5/10 flaking on inner race |
| | 9 | 716 | 11 | 228 | 7/10 flaking on inner race |
| | 10 | 742 | 24 | 234 | 8/10 flaking on inner race |
| | 11 | 738 | 8 | 211 | 9/10 flaking on inner race |
| | 12 | 742 | 24 | 243 | 7/10 flaking on inner race |
| | 13 | 759 | 31 | 276 | 6/10 flaking on inner race |
| | 14 | 899 | 33 | 300→ | None |
| | 15 | 763 | 44 | 291 | 4/10 flaking on inner race |
| | 16 | 774 | 23 | 268 | 5/10 flaking on inner race |
| | 17 | 895 | 36 | 300→ | None |
| | 18 | 763 | 28 | 253 | 5/10 flaking on inner race |
| | 19 | 755 | 1 | 269 | 5/10 flaking on inner race |
| | 20 | 815 | 45 | 300→ | None |
| Comparative Example | 1 | 735 | 8 | 22 | 10/10 flaking on inner race |
| | 2 | 425 | 35 | 11 | 10/10 flaking on inner race |
| | 3 | 410 | 31 | 12 | 10/10 flaking on inner race |
| | 4 | 665 | 19 | 19 | 10/10 flaking on inner race |
| | 5 | 713 | 25 | 74 | 10/10 flaking on inner race |
| | 6 | 756 | 39 | 64 | 10/10 flaking on inner race |
| | 7 | 650 | 13 | 98 | 10/10 flaking on inner race |
| | 8 | 723 | 21 | 55 | 10/10 flaking on inner race |
| | 9 | 712 | 3 | 26 | 10/10 flaking on inner race |
| | 10 | 756 | 36 | 54 | 10/10 flaking on inner race |
| | 11 | 670 | 31 | 91 | 10/10 flaking on inner race |
| | 12 | 685 | 45 | 95 | 10/10 flaking on inner race |
| | 13 | 805 | 17 | 68 | 10/10 flaking on inner race |
| | 14 | 788 | 8 | 65 | 10/10 flaking on inner race |
| | 15 | 823 | 28 | 88 | 10/10 flaking on inner race |

TABLE 2-continued

| | Surface Hardness (Hv) | Surface γR vol (%) | L10 (hr) | Flaking |
|---|---|---|---|---|
| 16 | 671 | 1 | 42 | 10/10 flaking on inner race |
| 17 | 753 | 30 | 59 | 10/10 flaking on inner race |
| 18 | 796 | 43 | 63 | 10/10 flaking on inner race |

The results in Tables 1 and 2 show that Examples 1 to 20 comprise titanium carbides and titanium carbonitrides having an average particle diameter of not more than 80 nm finely dispersed in the steel material and exhibit a surface hardness Hv of not less than 700. All these examples exhibited a bearing life $L_{10}$ of not shorter than 200 hours, which is not shorter than about 4 times the calculated life and longer than Comparative Examples 1 to 18.

In particular, Examples 2, 6, 14, 17 and 20 comprise titanium carbides and titanium carbonitrides having an average particle diameter of not more than 50 nm finely divided in the steel material and exhibit a surface hardness Hv of from 800 to 900 and a retained austenite content (γR) of from 30 to 45 vol-%.

These rolling bearings exhibited so extremely long an bearing life $L_{10}$ as to undergo no flaking even after 300 hours of operation.

On the other hand, Comparative Examples 1 to 18 all exhibit a bearing life $L_{10}$ of not longer than 100 hours. The resulting flaking conditions all occurred on the inner ring. The flaking started at the impressions made by foreign matters. In particular, Comparative Examples 1, 2 and 17, which are free of Ti, showed no TiC finely deposited therein and thus exhibited a shortened life. Further, Comparative Examples 3, 4, 5 and 8, which had not undergone solution treatment of Ti, showed no deposition of TiC having an average particle diameter of not more than 80 nm and thus were not long-lived. Comparative Example 3 has the same composition as described in the above cited Kobe Steel Ltd.'s Technical Report. Comparative Example 4 has the same composition as described in JP-A-9-53169. Neither of the two specimens were subjected to solution treatment of Ti. Comparative Examples 6 and 15 (corresponding to that described in JP-B-7-110988) have a Ti content as small as 0.005% and a great Cr or surface carbon content that gives coarse TiC particles. Thus, only several TiC particles having a diameter of not less than 500 nm could be observed deposited. Accordingly, the rolling bearings of Comparative Examples 6 and 15 were not long-lived. In Comparative Example 7, the steel material has small C and Si contents and a surface carbon content as low as 0.68% and thus exhibits an insufficient hardenability. Comparative Examples 9 and 13 have a Ti content as great as not less than 0.5% and thus comprise no fine TiC and TiCN particles deposited therein. Thus, the rolling bearings of Comparative Examples 9 and 13 were short-lived as compared with that of Examples 1 to 20. Comparative Example 10 has a Ti content as small as 0.005% but a high surface carbon content that gives coarse TiC particles. Further, Comparative Examples 11, 12 and 16 comprised TiC and TiCN particles having a particle diameter of not more than 80 nm dispersed and deposited therein but exhibited a surface hardness Hv of not more than 700.

Thus, the rolling bearings of Comparative Examples 11, 12 and 16 leave something to be desired in resistance to impression made by foreign matters and were not long-lived. Comparative Example 14 exhibited a Ti content as small as 0.025% and thus comprised no TiC having a particle diameter of not more than 80 nm dispersed and deposited therein. Comparative Example 18 has a low Ti content and a high Mn content but comprised TiC having an average particle diameter of 180 nm rather than not more than 80 nm dispersed therein. The rolling bearing of Comparative Example 18 was not long-lived.

Comparison Test 2

This was a life test made by operating the rolling bearing while being lubricated in the presence of water.

Rolling bearings as specimens to be tested were produced from inner rings 2 and outer rings 3 made of steel materials having the chemical compositions of Examples 1, 4, 8, 11, 14, 17 and 20 and Comparative Examples 1, 3, 7, 10, 13 and 15 and rolling bodies 4 made of ordinary bearing steel of the second kind.

Testing Apparatus

The same testing apparatus as used in Comparison Test 1 was used.

Testing Method

This test was effected while being lubricated with a Type VG68 lubricant mixed with 1% tap water. The model number of the specimen bearing, the testing load and the rotary speed were the same as used in Comparison Test 1. This endurance test was made 10 times for each specimen. The test was suspended when the bearing 1 showed vibration five times as much as the initial value.

The bearing 1 was then observed for flaking. The testing time was predetermined to 500 hours.

Table 3 shows the results of the life test as Comparison Test 2.

TABLE 3

| | TiC, TiCN, (nm) | Surface Hardness (Hv) | Surface γR (%) | L10 (hr) | Flaking |
|---|---|---|---|---|---|
| Example 1 | 80 | 723 | 19 | 404 | flaking on 4 inner races and 4 outer races |
| Example 4 | 24 | 763 | 26 | 459 | flaking on 3 inner races and 3 outer races |
| Example 8 | 42 | 751 | 25 | 411 | flaking on 4 inner races and 4 outer races |
| Example 11 | 80 | 738 | 8 | 425 | flaking on 4 inner races and 4 outer races |
| Example 14 | 45 | 889 | 33 | 492 | flaking on 2 inner races and 2 outer races |
| Example 17 | 10 | 895 | 36 | 498 | flaking on 2 inner races and 2 outer races |
| Example 20 | 50 | 815 | 45 | 487 | flaking on 2 inner races and 2 outer races |
| Comparative Example 1 | 0 | 735 | 8 | 115 | flaking on 5 inner races and 5 outer races |
| Comparative Example 3 | 110 | 410 | 31 | 142 | flaking on 5 inner races and 5 outer races |
| Comparative Example 7 | 50 | 650 | 13 | 193 | flaking on 5 inner races and 5 outer races |
| Comparative Example 10 | 571 | 756 | 36 | 156 | flaking on 5 inner races and 5 outer races |

TABLE 3-continued

|  | TiC, TiCN, (nm) | Surface Hardness (Hv) | Surface γR (%) | L10 (hr) | Flaking |
|---|---|---|---|---|---|
| Comparative Example 13 | 356 | 805 | 17 | 135 | flaking on 5 inner races and 5 outer races |
| Comparative Example 15 | 571 | 823 | 28 | 126 | flaking on 5 inner races and 5 outer races |

These results show that Examples 1, 4, 8, 11, 14, 17 and 20 exhibit a life $L_{10}$ of not shorter than 400 hr, which is twice or three times as long as the comparative examples. Referring to the reason for this effect, the steel material of Examples 1, 4, 8, 11, 14, 17 and 20 comprises TiC and TiCN particles having an average particle diameter of not more than 80 nm suspended and deposited therein and exhibits a surface hardness Hv of not less than 700. Even when the rolling bearings of these examples are operated lubricated in the presence of water, TiC and TiCN act as a hydrogen trap site (hydrogen trapping region) to cause hydrogen to undergo dispersion and adsorption at the interface of TiC and TiCN, making it difficult to develop defects. Further, the pinning effect of TiC and TiCN particles makes it possible to prevent the expansion of the plastically deformable region of the forward end of crack. As a result, the corrosion pitting (including hydrogen-induced cracking) can be retarded.

On the other hand, Comparative Examples 1, 3, 10, 13 and 15 comprise no TiC and TiCN particles having an average particle diameter of 80 nm dispersed and deposited therein and thus cannot allow hydrogen to undergo dispersion and absorption. Further, if the steel material exhibits a surface hardness Hv of about 650 as in Comparative Example 7, it is liable to plastic deformation at the maximum shearing stress site. The resulting rolling bearing can hardly be long-lived.

Comparison Test 3

This was a life test made by a two-cylinder abrasion testing machine.

Specimens to be tested were produced from steel materials having the chemical compositions of Examples 1, 4, 8, 11, 14, 17 and 20 and Comparative Examples 1, 3, 7, 10, 13 and 15 as in Comparison Test 2.

Testing Apparatus

Figure 4:
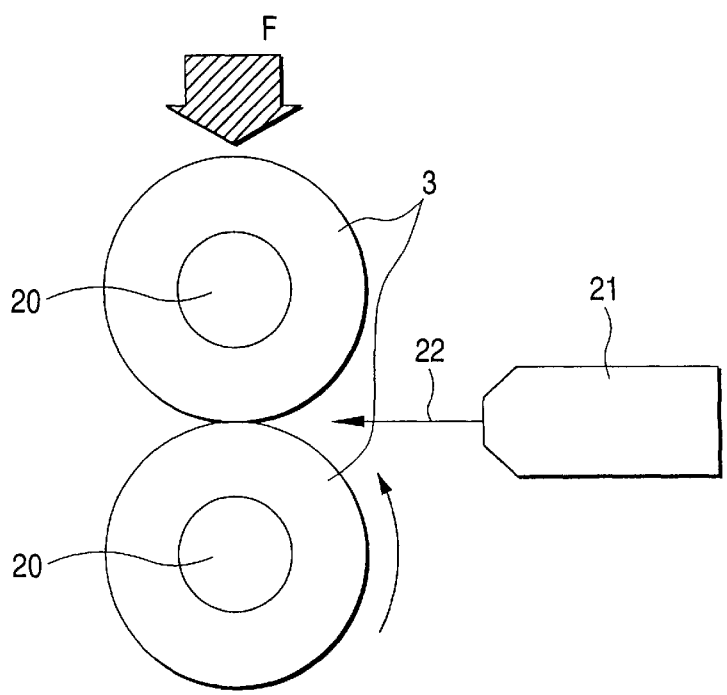
FIG. 4 is a schematic diagram illustrating a two-cylinder abrasion testing machine used in Comparison Life Test 3 on a rolling bearing.

A two-cylinder abrasion testing machine shown in FIG. 4 was used.

Testing Method

The ring 3 (outer diameter: 30 mm; width: 7 mm) as a specimen was mounted on a pair of cylinders 20 provided vertically opposed to each other in the two-cylinder abrasion testing machine.

A load F was then applied downward to the upper cylinder while a lubricant 22 was being sprayed on the gap therebetween from a nozzle 21 and the rings 3 were being rotated in contact with each other at a low speed in opposite directions. Under these conditions, the rings 3 were measured for average specific abrasion (mg/$10^6$ rotations).

Figure 5:
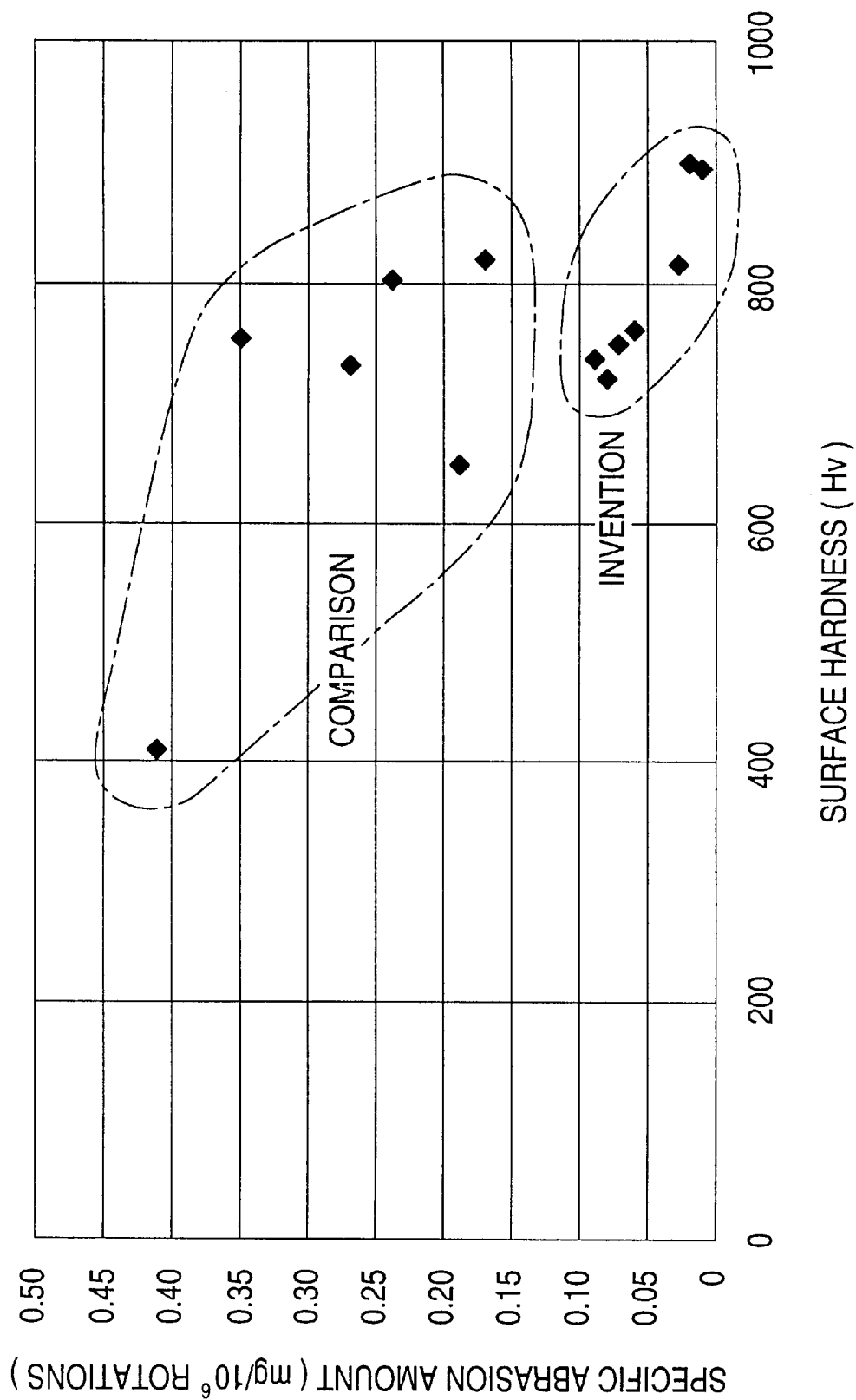
FIG. 5 illustrates the results of the two-cylinder abrasion test on examples of the present invention and comparative examples in Comparison Life Test 3.

Face pressure: 100 kgf/mm²
Rotary speed: 1,000 rpm
Percent slippage: 20%
Lubricant: FBK Oil RO80
Lubricant supply rate: 700 cc/min Table 4 shows the results of the two-cylinder abrasion test as Comparison Test 3. FIG. 5 is a graph illustrating the relationship between the surface hardness and the specific abrasion in this life test.

TABLE 4

|  | TiC, TiCN, (nm) | Surface Hardness (Hv) | Surface γR (%) | Specific Abrasion Amount (mg/$10^6$ rotations) |
|---|---|---|---|---|
| Example 1 | 80 | 723 | 19 | 0.08 |
| Example 4 | 24 | 763 | 26 | 0.06 |
| Example 8 | 42 | 751 | 25 | 0.07 |
| Example 11 | 80 | 738 | 8 | 0.09 |
| Example 14 | 45 | 899 | 33 | 0.02 |
| Example 17 | 10 | 895 | 36 | 0.01 |
| Example 20 | 50 | 815 | 45 | 0.03 |
| Comparative Example 1 | 0 | 735 | 8 | 0.27 |
| Comparative Example 3 | 110 | 410 | 31 | 0.41 |
| Comparative Example 7 | 50 | 650 | 13 | 0.19 |
| Comparative Example 10 | 571 | 756 | 36 | 0.35 |
| Comparative Example 13 | 356 | 805 | 17 | 0.24 |
| Comparative Example 15 | 571 | 823 | 28 | 0.17 |

These results show that Examples 1, 4, 8, 11, 14, 17 and 20, which satisfy the claimed requirements for % surface C and N contents of specimen, comprise TiC and TiCN particles having an average particle diameter of not more than 80 nm dispersed and deposited therein and exhibit a surface hardness Hv of not less than 700 and a specific abrasion as small as not more than ⅓ of that of the comparative examples. In particular, Examples 14, 17 and 20 exhibit a retained austenite content of from 30 to 45 vol-% and a surface hardness Hv of not less than 800 and thus show an enhanced deformation resistance and a specific abrasion amount of from 0.01 to 0.03 mg/$10^6$ rotations.

In the foregoing life test, as the rolling bearing to be tested there was used one comprising an inner ring produced according to the present invention. However, the present invention can be similarly applied to the outer ring and rolling elements of the rolling bearing. Further, the present invention may be selectively applied to any one or two members of the inner ring, outer ring and rolling elements.

As mentioned above, the rolling bearing according to the present invention comprises fine titanium carbides and titanium carbonitrides having an average particle diameter of not more than 80 nm dispersed in the surface and interior of at least one member among the inner ring, outer ring and rolling elements constituting the bearing to have a surface hardness Hv of not less than 700.

The resulting enhancement of abrasion resistance makes the rolling bearing according to the present invention less liable to the occurrence of impressions on the track even in the presence of foreign matters. Further, the resulting enhancement of toughness makes it possible to retard the propagation of cracks, if any. As a result, a rolling bearing which can be long-lived as compared with the prior art products can be obtained.

Moreover, even when the lubrication is effected in the presence of water, titanium carbides and titanium carbonitrides can become hydrogen trap sites that cause hydrogen to undergo dispersion and adsorption at the interface of titanium carbides and titanium carbonitrides, making it difficult to make defects and reduce the concentration of hydrogen in the plastically deformable region of the forward end of crack. As a result, the occurrence of corrosion pitting (including hydrogen-induced cracking) is retarded.

Further, the fine dispersion of titanium carbides and titanium carbonitrides having an average particle diameter of 50 nm resulting in an arrangement such that the surface hardness Hv is from 800 to 900 and the retained austenite content is from 30 to 45 vol-% makes it possible to provide an extreme enhancement of impression resistance and abrasion resistance that further prolongs the life of rolling bearing.

While the invention has been described in detail and with reference to specific embodiments thereof, it will be apparent to one skilled in the art that various changes and modifications can be made therein without departing from the spirit and scope thereof.

What is claimed is:

1. A rolling bearing comprising an inner ring, an outer ring and rolling elements as constituting members, wherein at least one of the members is formed by an alloy steel material for bearing and has been subjected to solution treatment such that titanium carbides or titanium carbonitrides having an average particle diameter of not more than 80 nm are dispersed in the surface and interior of the finished product, and then has been subjected to carburizing or carbonitriding, the alloy steel material having an alloy composition composed of:

C: 0.15 to 0.45% by weight;
Si: 0.1 to 1.2% by weight;
Mn: 0.2 to 1.5% by weight;
Cr: 0.2 to 1.6% by weight; and
Ti: 0.05 to 0.40% by weight.

2. The rolling bearing of claim 1, wherein the alloy composition further comprises Mo in an amount of 0.1 to 1.5% by weight.

3. The rolling bearing of claim 1, wherein the titanium carbides or titanium carbonitrides have an average particle diameter of not more than 50 nm.

4. The rolling bearing of claim 1, wherein the finished product of the member formed by the alloy steel material has a surface hardness of not less than Hv 800 and a retained austenite content of 30 to 45 vol %.

5. The rolling bearing of claim 2, wherein the finished product of the member formed by the alloy steel material has a surface hardness of not less than Hv 800 and a retained austenite content of 30 to 45 vol %.

6. The rolling bearing of claim 1, wherein the finished product of the member formed by the alloy steel material has a surface C content of 0.8 to 1.2%.

7. The rolling bearing of claim 1, wherein the finished product of the member formed by the alloy steel material has a surface N content of 0.05 to 0.50% and a surface C content of 0.8 to 1.2%.

8. The rolling bearing of claim 1, wherein the finished product of the member formed by the alloy steel material has a surface hardness of Hv 700 or more.

* * * * *